US011253859B2

(12) United States Patent
Flory et al.

(10) Patent No.: US 11,253,859 B2
(45) Date of Patent: Feb. 22, 2022

(54) MICROFLUIDIC DIELECTROPHORETIC DROPLET EXTRACTION

(71) Applicant: AGILENT TECHNOLOGIES, INC., Santa Clara, CA (US)

(72) Inventors: Curt A. Flory, Los Altos, CA (US); Dustin Chang, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 290 days.

(21) Appl. No.: 16/399,439

(22) Filed: Apr. 30, 2019

(65) Prior Publication Data

US 2020/0346215 A1 Nov. 5, 2020

(51) Int. Cl.
*B01L 3/00* (2006.01)

(52) U.S. Cl.
CPC . *B01L 3/502784* (2013.01); *B01L 2300/0645* (2013.01); *B01L 2300/0861* (2013.01)

(58) Field of Classification Search
CPC ..... B01L 2200/0673; B01L 2300/0645; B01L 2300/0861; B01L 2400/0424; B01L 3/502784; G01N 15/00
See application file for complete search history.

(56) References Cited

U.S. PATENT DOCUMENTS

| 8,697,008 B2 | 4/2014 | Clarke et al. | |
|---|---|---|---|
| 2012/0091004 A1* | 4/2012 | Abell | B01J 19/0093 204/556 |
| 2013/0109575 A1* | 5/2013 | Kleinschmidt | G01N 33/5302 506/2 |

FOREIGN PATENT DOCUMENTS

| EP | 1895308 A1 | 3/2008 |
|---|---|---|
| WO | 9612541 A1 | 5/1996 |
| WO | 2004071638 A2 | 8/2004 |
| WO | 2009050512 A2 | 4/2009 |

OTHER PUBLICATIONS

Uchechukwu C. Wejinya, Ning Xi, King Wai Chiu Lai, Chapter 3—Design and Generation of Dielectrophoretic Forces for Manipulating Carbon Nanotubes, Editor(s): Ning Xi, King Wai Chiu Lai, "In Micro and Nano Technologies, Nano Optoelectronic Sensors and Devices", William Andrew Publishing, pp. 29-49 (Year: 2012).*

(Continued)

*Primary Examiner* — Jennifer Wecker
*Assistant Examiner* — Jonathan Bortoli

(57) ABSTRACT

A microfluidic apparatus for separating a droplet of an emulsion in a microfluidic environment is described. The microfluidic apparatus includes a flow cell comprising a first microfluidic channel configured for flowing a first fluid through the flow cell and a second microfluidic channel configured for flowing a stream of a second fluid through the flow cell. The microfluidic apparatus further comprises a first electrode positioned at the first microfluidic channel and a second electrode positioned at the second microfluidic channel on an opposite side of the interface with respect to the first electrode. The first electrode, the second electrode, and the first and second microfluidic channels are configured to generate a non-uniform electric field gradient in the microfluidic apparatus.

18 Claims, 6 Drawing Sheets

(56) References Cited

OTHER PUBLICATIONS

Fidalgo, L.M., et al., "From Microdroplets to Microfluidics: Selective Emulsion Separation in Microfluidic Devices," Angew. Chem. Int. Ed., 2008, vol. 47, pp. 2042-2045.
Fidalgo, L.M., et al., "Coupling Microdroplet Microreactors with Mass Spectrometry: Reading the Contents of Single Droplets Online," Angew. Chem. Int. Ed., 2009, vol. 48, pp. 3665-3668.
Notification of Transmittal of The International Search Report & Written Opinion dated Jul. 31, 2020, Application No. PCT/US2020/028794, 14 pages.

\* cited by examiner

MICROFLUIDIC DIELECTROPHORETIC DROPLET EXTRACTION

CROSS-REFERENCE TO RELATED APPLICATIONS

None.

FIELD OF THE INVENTION

The invention relates generally to methods and apparatus to separate droplets from an emulsion in a microfluidic environment.

BACKGROUND OF THE INVENTION

Microfluidic systems can offer a range of advantageous features in the transport, control, and manipulation of minute fluid amounts. For example, micron-scale (and smaller) aqueous droplets carried in a continuous immiscible oil phase in microfluidic devices have many advantages over single-phase systems for biological, chemical, and biochemical assays. Specifically, the individual droplets form separate and isolated compartments for performing chemical and biological reactions in picoliter to nanoliter volumes without dilution and cross-contamination. Furthermore, many characterization techniques, including but not limited to fluorescence-based techniques, have been developed for high-throughput and sensitive analysis of droplet contents. As a result, microdroplets can be used in a wide variety of important applications.

The fact that the droplets are intrinsically separate and isolated compartments is an advantage for use in many applications, however it can be a hindrance for others. The isolated nature of the droplets precludes direct physical access to their contents by traditional continuous-flow single phase microfluidic systems. For example, certain continuous-flow analytical techniques such as mass spectrometry (MS), liquid phase chromatography (LC), capillary electrophoresis (CE), and combined methods such as LC-MS cannot be directly integrated with droplet-based systems due to the lack of access to the droplet contents without also introducing the surrounding immiscible oil phase, which is incompatible with the mentioned techniques.

To address this problem a technique was needed that could take the contents of a sequence of droplets, empty them individually into a proximal flowing stream of (aqueous-based) carrier fluid which is compatible with downstream analytical techniques, and perform this in a fashion compatible with conventional continuous-flow microfluidic devices. A previous attempt to achieve this employs two proximal co-flowing channels, one containing the droplet emulsion and the other a stream of (aqueous) fluid compatible with the downstream work flow. The channels are connected by a rectangular region which maintains a stable flow-boundary between the channels, and a uniform electric field is applied across this connecting region. The electric field induces an electro-coalescing force that induces the droplets to move from the emulsion channel to the aqueous channel, with the droplet merging with the aqueous fluid, effectively emptying its contents in the new stream, and leaving the carrier oil behind.

While this previous attempt demonstrates the transfer the droplet contents to a continuously flowing stream, it is based upon a relatively weak electro-hydrodynamic effect called electro-coalescence, which is actuated by the uniform electric field applied to the region between the two co-flowing proximal fluidic channels. Electro-coalescence is typically used to break emulsions by generating a relative attraction between the droplets comprising the emulsion. This is accomplished by applying a uniform electric field across the emulsion, where the emulsion contains conducting droplets or highly polarizable droplets embedded in a non-conducting immiscible fluid (typically oil). The droplets will develop electric dipole moments in response to the applied field, with the induced moments aligned with respect to the field direction. The dipole moments induced in the droplets interact with one another, and due to their coordinated orientations, they experience a relative attraction to one another. The net electro-coalescence force, $F_{E-C}$, experienced by a droplet pair is shown to have the dipole-dipole form $$F_{E-C} = 24\pi\varepsilon_M \frac{a^3 b^3}{(\rho + a + b)^4}(E_0)^2 \quad (1)$$

where $\varepsilon_M$ is the dielectric constant of the continuous oil medium, a and b are the radii of the two droplets, p is the distance between their centers, and $E_0$ is the electric field strength. There is a rapid ($\sim\rho^{-4}$) fall-off for the weak dipole-dipole interaction. For the geometry utilized by the previous attempt, the electro-coalescence dynamics are slightly different in that the applied uniform electric field is intended to cause an aqueous droplet to be attracted to (merge with) a (large) channel of water. In this case, the electrically conductive channel of water acts as a terminating electrode for the uniform applied electric field. The electro-coalescence force generated on the droplet for this configuration is the dipole-dipole attractive force between the droplet and its image droplet at a mirrored position behind the surface of the water channel. The net attractive electro-coalescence force between the droplet and the water channel is established by modifying Equation 1 to be $$F_{E-C} = \frac{3}{2}\pi\varepsilon_M \frac{a^6}{(d+a)^4}(E_0)^2 \quad (2)$$

where d is the distance between the center of the droplet and the edge of the water channel. Note that the already weak electric dipole-dipole force, which is the basis of the electro-coalescence effect, is diminished due to the geometry of the water channel and the effective "distance doubling" to the force-generating image dipole charge.

As a result of the weak forces generated through the electro-coalescence effect, a large electric field strength ($\sim 10^7$ V/m) is required to coalesce a droplet with the aqueous channel, and for typical dimensions for a conventional microfluidic chip, an attendant applied voltage of 1.5-3.0 kV would be required.

WO2009050512 A2 discusses microfluidic systems and more particularly methods and apparatus for accessing the contents of micro droplets in an emulsion stream. In method of accessing the contents of a droplet of an emulsion in a microfluidic system, the method comprises: flowing the emulsion alongside a continuous, non-emulsion stream of aqueous fluid to provide an interface between said emulsion and said stream of aqueous fluid; and in embodiments applying one or both of an electric and magnetic field across said interface to alter a trajectory of a said droplet of said emulsion to cause said droplet to coalesce with said stream of aqueous fluid; and accessing said contents of said droplet in said second stream.

What would be beneficial from a practical implementation standpoint would be a device based upon a more powerful and efficient electro-hydrodynamic effect, allowing a significant reduction of the required field and voltages. This would allow a less expensive, safer, and simpler implementation of the droplet transfer dynamic. Therefore, an improved system that extracts a droplet from an emulsion is desired.

SUMMARY OF THE INVENTION

As one aspect of the present invention, methods are provided for separating a droplet of an emulsion in a microfluidic environment. The methods generally comprise flowing an emulsion comprising aqueous droplets in a non-aqueous medium through a first microfluidic channel and flowing an aqueous medium through a second microfluidic channel alongside the first microfluidic channel. The methods further include subjecting the emulsion to a non-uniform electric field gradient such that the aqueous droplets separate from the emulsion and enter the aqueous medium via a connecting region disposed between the first microfluidic channel and the second microfluidic channel.

As another aspect of the present invention, microfluidic apparatus are provided for separating a droplet of an emulsion in a microfluidic environment. The apparatus generally comprise a flow cell comprising a first microfluidic channel including a first microfluidic entry channel and first microfluidic exit channel for flowing a first fluid through the flow cell and a second microfluidic channel including a second microfluidic entry channel and second microfluidic exit channel for flowing a stream of a second fluid through the flow cell. In operation, the microfluidic apparatus are configured to form an interface in the flow cell between the first and second fluids. The microfluidic apparatus further comprise a first electrode positioned at the first microfluidic channel and a second electrode positioned at the second microfluidic channel on an opposite side of the interface with respect to the first electrode, wherein the first electrode and the second electrode are configured to generate a non-uniform electric field gradient.

These and other features and advantages of the present methods and apparatus will be apparent from the following detailed description, in conjunction with the appended claims.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

Figure 1:
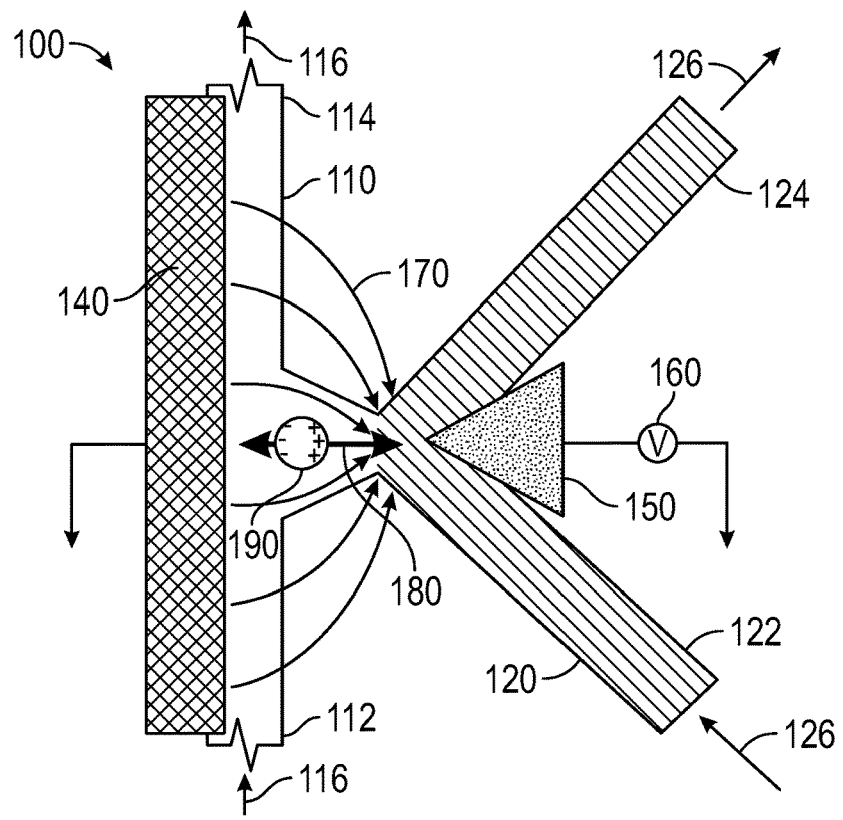
FIG. 1 is a schematic view of a microfluidic device in accordance with a representative embodiment.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used herein, and in addition to their ordinary meanings, the terms "substantial" or "substantially" mean to within acceptable limits or degree to one having ordinary skill in the art.

As used herein, the terms "approximately" and "about" mean to within an acceptable limit or amount to one having ordinary skill in the art. The term "about" generally refers to plus or minus 15% of the indicated number. For example, "about 10" may indicate a range of 8.5 to 11.5. For example, "approximately the same" means that one of ordinary skill in the art considers the items being compared to be the same.

In the present disclosure, numeric ranges are inclusive of the numbers defining the range. It should be recognized that chemical structures and formula may be elongated or enlarged for illustrative purposes.

Before the various embodiments are described, it is to be understood that the teachings of this disclosure are not limited to the particular embodiments described, and as such can, of course, vary. It is also to be understood that the terminology used herein is for the purpose of describing particular embodiments only, and is not intended to be limiting, since the scope of the present teachings will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present teachings, some exemplary methods and materials are now described.

All patents and publications referred to herein are expressly incorporated by reference.

As used in the specification and appended claims, the terms "a," "an," and "the" include both singular and plural referents, unless the context clearly dictates otherwise. Thus, for example, "a moiety" includes one moiety and plural moieties.

As used herein, the term "microfluidic environment" means a substrate including networks of channels having dimensions from tens to hundreds of microns. The channels are configured to flow, manipulate and otherwise control fluids in the range of microliters to picoliters.

As one aspect of the present invention, a microfluidic device (e.g., a microfluidic chip) is provided that efficiently transfers the contents of aqueous droplets from a stream of immiscible fluid (e.g., droplet emulsion) into a proximal, but separate, stream of aqueous fluid (e.g., water). The microfluidic device facilitates full transfer of the droplet contents from the stream of immiscible fluid to the stream of aqueous fluid with minimal transfer of the immiscible fluid.

DETAILED DESCRIPTION

Figure 2:
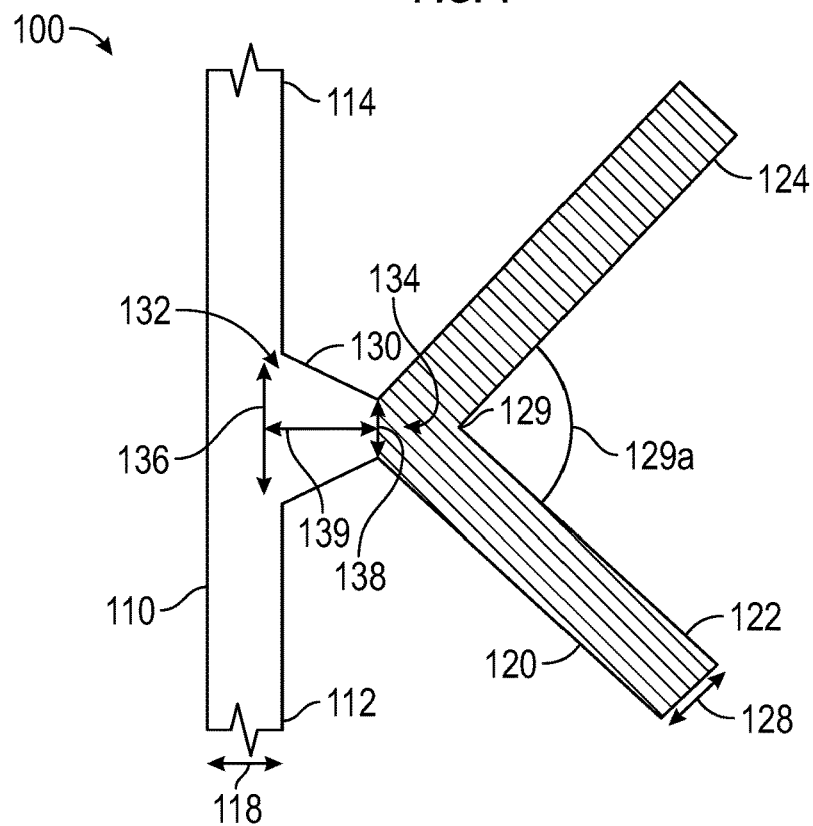
FIG. 2 is a schematic view showing various dimensions of the microfluidic device of FIG. 1.

FIGS. 1 and 2 illustrate an example of a microfluidic device 100 including a first microfluidic channel 110, a second microfluidic channel 120, and a connecting region 130 disposed between the first microfluidic channel 110 and the second microfluidic channel 120. The microfluidic device 100 further includes a first electrode 140 positioned at the first microfluidic channel 110, a second electrode 150 positioned at the second microfluidic channel 120, and a voltage source 160 electrically coupled to the first and second electrodes 140 and 150.

The first microfluidic channel 110 includes a channel first end 112 (i.e., channel inlet) and a channel second end 114 (i.e., channel outlet) of a channel flow path for the immiscible fluid through the first microfluidic channel 110, represented by arrows 116. For example, the immiscible fluid enters the first microfluidic channel 110 at the channel first end 112, flows through the first microfluidic channel 110, and exits the first microfluidic channel 110 at the channel second end 114.

The second microfluidic channel 120 includes a channel first end 122 (i.e., channel inlet) and a channel second end 124 (i.e., channel outlet) of a channel flow path for the aqueous fluid through the second microfluidic channel 120, represented by arrows 126. For example, the aqueous fluid enters the second microfluidic channel 120 at the channel first end 122, flows through the second microfluidic channel 120, and exits the second microfluidic channel 120 at the channel second end 124. The connecting region 130 is connected to and in fluid communication with the first microfluidic channel 110 at a first connecting region opening 132 defined in the first microfluidic channel. Furthermore, the connecting region 130 is connected to and in fluid communication with the second microfluidic channel 120 at a second connecting region opening 134 defined in the second microfluidic channel 120.

In the illustrated example, the first microfluidic channel 110 has a first channel width 118 and the second microfluidic channel 120 has a second channel width 128 that is substantially equal to the first channel width 118. In one such example, the first channel width 118 and the second channel width 128 are each approximately 50 μm. However, it will be understood that other widths of the first and second microfluidic channels 110 and 120 are possible. Alternatively, the first channel width 118 can be different (i.e., greater or less) than the second microfluidic channel width 128. In the illustrated example, the first microfluidic channel 110 defines a substantially linear flow path between the channel first end 112 and the channel second end 114. Furthermore, the second microfluidic channel 120 defines a non-linear flow path between the channel first end 122 and the channel second end 124 such that the second microfluidic channel 120 flow path is non-parallel to the first microfluidic channel 110 flow path.

In the illustrated example, the second microfluidic channel 120 includes an inner channel corner 129 at a position of closest approach to the connecting region 130. In other words, the inner channel corner 129 is positioned opposite from the second connecting region opening 134 of the connecting region 130. The inner channel corner 129 is defined by an inner corner angle 129a of approximately 90 degrees or less. As such, the second microfluidic channel 120 is an angled channel that undergoes a sharp turn at the inner channel corner 129.

As further illustrated in FIGS. 1 and 2, the connecting region 130 includes a first width 136 defining the first connecting region opening 132, a second width 138 defining the second connecting region opening 134 and a connecting region length 139 between the first connecting region opening 132 and the second connecting region opening 134. In one non-limiting example, the second width 138 is smaller than the first width 136 such that the connecting region 130 tapers from the first microfluidic channel 110 to the second microfluidic channel 120. Accordingly, the first width 136 defines the first connecting region opening 132 as a wide end of the connecting region 130 connected to and in fluid communication with the first microfluidic channel 110 and the second width 138 defines the second connecting region opening 134 as a narrow end of the connecting region 130 connected to and in fluid communication with the second microfluidic channel 120. In one non-limiting example, the first width 136 is approximately 60 μm, the second width is approximately 20 μm, and the connecting region length 139 is 80 μm. However, it will be understood that other dimensions and/or geometries of the connecting region 130 are possible.

In the illustrated example, the first electrode 140 is configured as a relatively long and straight electrode having a substantially rectangular shape. The first electrode 140 serves as a source (or a sink) of disperse electric field lines 170 that define the relatively weak field region of the electric field. Furthermore, the second electrode 150 is configured as a relatively sharp electrode having an electrode point or tip. Microfluidic device 100 is configured such that the second electrode 150 need not have a specific sharpness of the electrode point because the second electrode 150 has a small effect on the generated field profile of the electric field. The second electrode 150 is generally configured to have a footprint that is within that of the second microfluidic channel 120.

Figure 3:
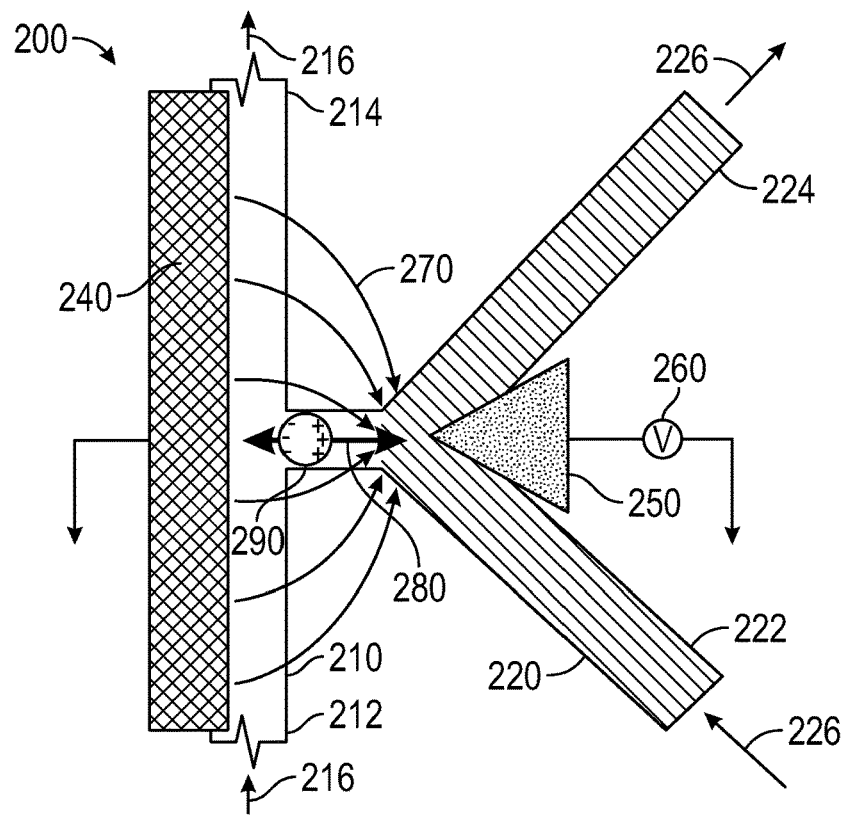
FIG. 3 is a schematic view of a microfluidic device in accordance with a representative embodiment.
Figure 4:
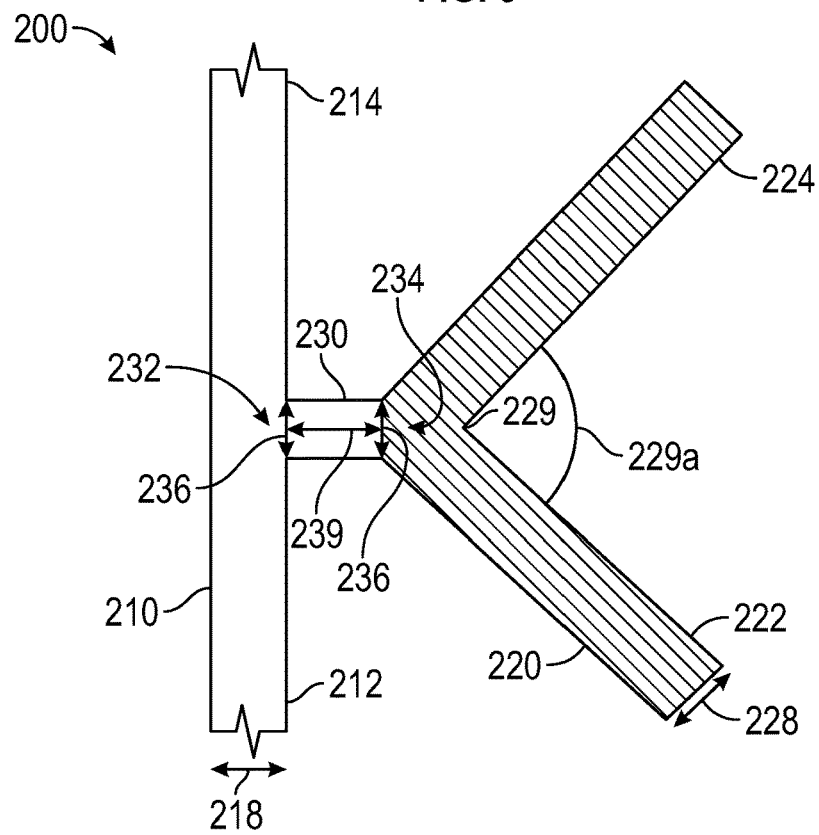
FIG. 4 is a schematic view showing various dimensions of the microfluidic device of FIG. 3.

FIGS. 3 and 4 illustrate another example of the microfluidic device 200 including a first microfluidic channel 210, a second microfluidic channel 220, and a connecting region 230 disposed between the first microfluidic channel 210 and the second microfluidic channel 220. The microfluidic device 200 further includes a first electrode 240 positioned at the first microfluidic channel 210, a second electrode 250 positioned at the second microfluidic channel 220, and a voltage source 260 electrically coupled to the first and second electrodes 240 and 250.

The first microfluidic channel 210 includes a channel first end 212 (i.e., channel inlet) and a channel second end 214 (i.e., channel outlet) which defines a channel flow path for the immiscible fluid through the first microfluidic channel 210, represented by arrows 216. For example, the immiscible fluid enters the first microfluidic channel 210 at the channel first end 212, flows through the first microfluidic channel 210, and exits the first microfluidic channel 210 at the channel second end 214.

The second microfluidic channel 220 includes a channel first end 222 (i.e., channel inlet) and a channel second end 224 (i.e., channel outlet) which defines a channel flow path for the aqueous fluid through the second microfluidic channel 220, represented by arrows 226. For example, the aqueous fluid enters the second microfluidic channel 220 at the channel first end 222, flows through the second microfluidic channel 220, and exits the second microfluidic channel 220 at the channel second end 224. The connecting region 230 is connected to and in fluid communication with the first microfluidic channel 210 at a first connecting region opening 232 defined in the first microfluidic channel 210, and the connecting region 230 is connected to and in fluid communication with the second microfluidic channel 220 at a second connecting region opening 234 defined in the second microfluidic channel 220.

In the illustrated example, the first microfluidic channel 210 has a first channel width 218 and the second microfluidic channel 220 has a second channel width 228 that is substantially equal to the first channel width 218. In one such example, the first channel width 218 and the second channel width 126 are each approximately 50 µm, however other widths of the first and second microfluidic channels 210 and 220 are possible. Additionally, in the illustrated example the first channel width 218 can be different (i.e., greater or less) than the second microfluidic channel 220. Moreover, the first microfluidic channel 210 defines a substantially linear flow path between the channel first end 212 and the channel second end 214. In the illustrated example, the second microfluidic channel 220 defines a non-linear flow path between the channel first end 222 and the channel second end 224 such that the second microfluidic channel 220 flow path is non-parallel to the first microfluidic channel 210 flow path.

In the illustrated example, the second microfluidic channel 220 includes an inner channel corner 229 at a position of closest approach to the connecting region 230. In other words, the inner channel corner 229 is positioned opposite from the second connecting region opening 234 of the connecting region 230. The inner channel corner 229 is defined by an inner corner angle 229a of approximately 90 degrees or less. As such, the second microfluidic channel 220 is an angled channel that undergoes a sharp turn at the inner channel corner 229.

As further illustrated in FIGS. 3 and 4, the connecting region 230 includes a connecting region width 236 that defines each of the first connecting region opening 232 and the second connecting region opening 234 of the connecting region 230. Accordingly, in the illustrated example the width of the first connecting region opening 232 is substantially equal to the width of the second connecting region opening 234. The connecting region 230 further includes a connecting region length 239 between the first connecting region opening 232 and the second connecting region opening 234. As such, the connecting region 230 generally has a square or rectangular shape. In one non-limiting example, the connecting region width 236 is approximately 60 µm and the connecting region length 239 is 40 µm. However, it will be understood that other dimensions and/or geometries of the connecting region 230 are possible.

In the illustrated example, the first electrode 240 is configured as a relatively long and straight electrode having a substantially rectangular shape. The first electrode 240 serves as a source (or a sink) of disperse electric field lines 270 that define the (relatively) weak field region of the electric field. Furthermore, the second electrode 250 is configured as a relatively sharp electrode having an electrode point or tip. Microfluidic device 200 is configured such that the second electrode 150 need not have a specific sharpness of the electrode point because the second electrode 250 has a small effect on the generated field profile of the electric field. The second electrode 250 is generally configured to have a footprint that is within that of the second microfluidic channel 220.

During operation, the microfluidic devices 100 and 200 are configured to transport the contents of a sequence of droplets (e.g., droplet 190 and 290) through a flowing stream (e.g., first microfluidic channels 110 and 210) of immiscible fluid, and empty them individually into a proximal flowing stream (e.g., second microfluidic channel 120 and 220) of aqueous-based carrier fluid. The aqueous-based carrier fluid is compatible with downstream analytical techniques such as but not limited to, mass spectrometry (MS), liquid phase chromatography (LC), capillary electrophoresis (CE), and any combinations therein. The microfluidic device 100 and 200 accomplishes this in a fashion compatible with conventional continuous-flow microfluidic devices. Note, that droplet 190 and 290 is drawn for illustrative purposes and is not necessarily drawn to scale.

In the illustrated examples, the electrode structure (e.g., first and second electrodes 140, 240, 150, and 250), the aqueous channel structure (e.g., second microfluidic channel 120 and 220), and the geometry of the connecting region (e.g., connecting region 130 and 230) between first and second microfluidic channels 110, 210, 120, and 220 are designed with a different dynamical intent. Accordingly, the exemplary microfluidic devices 100 and 200, illustrated in FIGS. 1 to 4, are configured to generate a strong electric field gradient that couples to the isolated (conductive and/or polarizable) droplets 190 and 290, to drive them to the second microfluidic channel 120 and 220 via strong dielectrophoretic forces (generated by the electric field 170 and 270). These forces can be made much larger than the weak short-distance electro-coalescence forces, because the dielectrophoretic forces are fundamentally based upon the direct coupling of the induced electric dipole moment of the droplet 190 and 290 with the externally established electric field gradient. The dielectrophoretic force has the form $$\vec{F}_d = 2\pi a^3 \varepsilon_M \kappa^{(1)} \vec{\nabla} E_0^2 \qquad (3)$$

where $$\kappa^{(1)} = \frac{(\varepsilon_{drop} - \varepsilon_M)}{(\varepsilon_{drop} + 2\varepsilon_M)} \qquad (4)$$

and $\kappa^{(1)}$ is the usual Clausius-Mossotti factor, $\varepsilon_{drop}$ is the effective dielectric constant of the droplet, and the other constants are as previously defined. Such use of dielectrophoretic forces enables manipulation of the droplets 190 and 290 in the presence of a conducting/highly-polarizable fluid channel. The reason for this is that a conducting fluid channel (i.e., the second microfluidic channel 120 and 220) acts as an equipotential surface, or effective electrode, with an extended shape that creates a strong electric field gradient proximal to the channel.

In order to highlight the value of the microfluidic device 100 and 200 for effecting droplet transfer, the relative strength of the dielectrophoretic force will be numerically contrasted with electro-coalescence forces.

As discussed above, the electro-coalescence force is generated by a uniform electric field which induces electric dipoles in individual conductive/polarizable droplets. In emulsions, the induced dipoles are aligned with the applied field, and thus secondary dipole-dipole attractive forces are generated between the droplets. In the droplet transfer platform of WO2009050512 A2, the electro-coalescence attractive forces are generated between a droplet and an extended (conductive) fluid-filled channel, which can be envisioned and evaluated as the dipole-dipole attraction between the droplet and the image droplet located at a mirrored position behind the surface of the fluidic channel.

The magnitude of this force can be determined by Equation (2), with the variables as defined in the accompanying text above.

In contrast, the herein disclosed microfluidic device 100 and 200 is designed to generate a strong electric field gradient (e.g., electric field 170 and 270) that couples to isolated conductive/polarizable droplets 190 and 290, and to drive the droplets 190 and 290 from the first microfluidic channel 110 and 210, through the connecting region 130 and 230 and into the second microfluidic channel 120 and 220 via a relatively strong dielectrophoretic force. The movement of droplets 190 and 290 is illustrated by arrow 180 and 280. This dielectrophoretic force can be made much larger than the weak short-distance electro-coalescence force because the generated dielectrophoretic force is fundamentally based upon the direct coupling of the induced electric dipole moment of the droplet with the externally established electric field gradient. The dielectrophoretic force can be determined by Equations 3 and 4, with the variables as defined and discussed above. To compare the relative strengths of the dielectrophoretic and electro-coalescence forces for comparable dimensions and voltages, the ratio of the expression for the dielectrophoretic force to that of the electro-coalescence force can be evaluated:

$$\frac{F_d}{F_{E-C}} = \frac{2\pi a^3 \varepsilon_M \kappa^{(1)} |\vec{\nabla} E_0^2|}{\frac{3}{2}\pi \varepsilon_M \frac{a^6}{(d+a)^4} E_0^2} \quad (5)$$

Using the fact that for highly polarizable droplets, as discussed above, the expression can be reduced to:

$$\frac{F_d}{F_{E-C}} \approx \frac{8(d+a)^4}{3da^3}. \quad (6)$$

For typical dimensions of d=100 μm and a=20 μm, $$\frac{F_d}{F_{E-C}} \approx 700. \quad (7)$$

Due to the fact that both $F_d$ and $F_{E-C}$ are proportional to $E^2_0$, and thus to the applied voltage squared, it is clear that for a voltage that is approximately 25 times lower, one can achieve the same droplet actuation force with the microfluidic device 100 and 200 using significantly lower voltage as one could achieve with the devices relying on electro-coalescence force. For example, devices relying on the electro-coalescence forces use voltages of 1.5-3.0 kV to generate the droplet actuation force. Conversely, the microfluidic device 100 and 200 relying on dielectrophoretic forces use voltages on the order of 50 to 100 volts to generate the droplet actuation force.

Accordingly, the microfluidic device 100 and 200 can be used to generate a dielectrophoretic force to effect droplet transfer from the first microfluidic channel 110 and 210 (i.e., droplet emulsion channel) to the proximal second microfluidic channel 120 and 220 (i.e., aqueous channel) upon application of a specified voltage by the voltage source 160 and 260. Remarkably, for comparable dimensions and voltages, the microfluidic device 100 and 200 generates a dielectrophoretic force on the droplet 190 and 290 that is on the order of 700 times larger than the electro-coalescence force generated by other such devices. As both dielectrophoretic and electro-coalescence forces are proportional to the field strength squared, the microfluidic device 100 and 200 can achieve the same droplet force using much lower voltage (e.g., 25 times lower) as other structures. This significant reduction of the required field and voltages allows a cheaper, safer, and simpler implementation of the droplet transfer dynamic.

As discussed above, the microfluidic device 100 and 200 is designed to take the contents of a sequence of droplets, empty them individually into a proximal flowing stream of aqueous-based carrier fluid (i.e., second microfluidic channel 120 and 220) compatible with various downstream analytical techniques. The microfluidic device 100 and 200 performs this droplet transfer in a fashion compatible with conventional continuous-flow microfluidic devices. The fundamental feature that distinguishes the microfluidic device 100 and 200 from previous attempts is that the droplet motion actuation is done through the dielectrophoretic force, which allows more efficient actuation, and substantially lower required voltages.

In order to generate the strong electric field gradients (e.g., electric field 170 and 270) required for efficient dielectrophoretic actuation, the microfluidic device 100 and 200 can include one or more of three features, each of which contributes to the desired effect.

The first of these features is the electrode structure. Referring back to FIGS. 1 and 3, the first electrode 140 and 240 is configured as a long flat extended electrode positioned at the first microfluidic channel 110 and 210. In the illustrated example, the first electrode 140 and 240 partially overlays the first microfluidic channel 110 and 210. As such, the first electrode 140 and 240 defines an extended equipotential surface that serves as a source (or sink) of dispersed E-field lines 170 and 270 that define the region of relatively weak field. The second electrode 150 and 250 is configured as a smaller sharp electrode that is either in direct contact with the second microfluidic channel 120 and 220 or positioned in close proximity to it. The second electrode 150 and 250 serves as the "sharp" electrode of the microfluidic device 100 and 200 and is configured to set the potential of the second microfluidic channel 120 and 220 either through direct contact or capacitive electrical coupling.

The second electrode 150 and 250 is configured differently than the sharp electrode of traditional dielectrophoretic devices. For traditional dielectrophoretic devices, the sharp electrode serves to "concentrate" the E-field lines emanating from the first long straight electrode (e.g., first electrode 140 and 240), generating the desired electric field gradient. This would be the normal dynamic when all of the surrounding materials are non-conductive and not highly polarizable (moderate dielectric constant). However, the microfluidic device 100 and 200 includes an intervening region of conductive material or high dielectric constant material proximal to the second electrode 150 and 250, (in the form of the second microfluidic channel 120 and 220). Such conductive material acts as an effective proxy electrode with regard to the field shape and configuration of the E-field lines 170 and 270. This holds true for direct electrical contact between the second electrode 150 and 250 (referred to herein as a sharp electrode) and the second microfluidic channel 120 and 220, and is also true when the second electrode 150 and 250 and the second microfluidic channel 120 and 220 are merely in close proximity with respect to each other and have a large mutual capacitance. Thus, for the microfluidic device 100 and 200, the second electrode 150 and 250 need not be particularly sharp, because it has a weaker effect on the generated electric field profile than the shape of the second microfluidic channel 120 and 220. As long as the second electrode 150 and 250 has a footprint that is within that of the proximal second microfluidic channel 120 and 220 (and not far from the second microfluidic channel 120 and 220 in the dimension out of the page), the second electrode 150 and 250 provides the necessary electrical contact to the effective electrode (i.e., second microfluidic channel 120 and 220 referred to herein as the effective electrode).

The second feature is the shape of the second microfluidic channel 120 and 220. As discussed above, due to the strong electrical coupling to second electrode 150 and 250, the second microfluidic channel 120 and 220 acts as a proxy electrode for the microfluidic device 100 and 200. More specifically, the second microfluidic channel 120 and 220 is configured to perform the function of the sharp electrode by undergoing a sharp turn via the inner channel corner 129 and 229 (having inner corner angle 129a and 229a less than or equal to approximately 90 degrees). This creates an electric field concentration on the right side of the connecting region 130 and 230, and generates the desired field gradient. It should be further noted that this proxy effective electrode has a surface defined by a movable meniscus, (e.g., meniscus 690 of FIGS. 6A to 6C and 7A to 7C) which exists between the conductive fluid in the second microfluidic channel 120 and 220 and the non-conductive fluid of the first microfluidic channel 110 and 210. In order to maximize the field concentration (and thus, field gradient), it is beneficial to maintain the position of the meniscus near the second connecting region opening 134 and 234 of the connecting region 130 and 230 between the first and second microfluidic channels 110, 210, 120, and 220.

The third feature which can help to generate strong electric field line gradients 170 and 270 is the geometry and/or shape of the connecting region 130 and 230 between the first microfluidic channel 110 and 210 and the second microfluidic channel 120 and 220. The geometry and/or shape of the connecting region 130 and 230 performs two important functions in the creation of the electric field gradient. First, the connecting region 130 and 230 helps to define the sharpness of the effective electrode (i.e., the second microfluidic channel 120 and 220) of the microfluidic device 100 and 200. Second, the material used for forming the walls of the connecting region 130 and 230, as well as the walls of the first and second microfluidic channels 110, 210, 120, and 220, helps focus the electric field 170 and 270 generated by the microfluidic device 100 and 200.

In one non-limiting example illustrated in FIGS. 1 and 2, the second connecting region opening 134 (i.e., the narrow end) of the connecting region 130 adjacent to the second microfluidic channel 120 helps define the sharpness of the effective electrode formed by the second microfluidic channel 120. Additionally, if the material forming the walls of the connecting region 130 and 230, and the first and second microfluidic channels 110, 210, 120 and 220 has a lower dielectric constant than that of the fluid filling the connecting region 130 and 230, there is a net focusing of the electric field lines into the shape of the tapered connecting region 130 (i.e., towards the second connecting region opening 134), further contributing to the creation of a strong electric field gradient. In other words, there is a concentration of field strength in the higher dielectric material. The dielectric constant difference between the enclosed fluid and surrounding walls of the connecting region 130 can be exploited to increase the electric field gradient beyond that generated merely from the shape of the second microfluidic channel 120 and 220 (i.e., effective electrode of device).

In one non-limiting example, the first microfluidic channel 110 and 220 and the connecting region 130 and 230 is filled with Novec 7500 (immiscible fluid with a dielectric constant of 5.8). The connecting region 130 and 230, and the first and second microfluidic channels 110, 210, 120, and 220, of the microfluidic device 100 and 200 are fabricated out of polyimide (material with a dielectric constant of 3.4). Furthermore, the exemplary microfluidic device 100 and 200, includes a thickness (depth) of about 50 μm for the first and second microfluidic channels 110, 210, 120, and 220. The first and second electrodes 140, 240, 150 and 250 are separated from the top of the first and second microfluidic channels 110, 210, 120, and 220, by a 2 μm insulating layer. Furthermore, the first microfluidic channel 110 and 210, the second microfluidic channel 120 and 220, and the connecting region 130 and 230 are surrounded by polyimide material. The entire microfluidic device 100 is sandwiched above and below by 200 μm thick sheets of polyimide. The first microfluidic channel 110 and 210 and the connecting region 130 and 230 (up to the second microfluidic channel 120 and 220) is filled with the Novec 7500. The second microfluidic channel 120 and 220 is filled with deionized (DI) water. As such, the dielectric constant difference between the Novec 7500 (i.e., fluid in first microfluidic channel 110 and 210, and connecting region 130 and 230) and the polyimide walls (material forming first microfluidic channel 110 and 210, and the connecting region 130 and 230) helps to increase the electric field gradient (electric field 170 and 270) generated by the microfluidic device 100 and 200. However, it will be understood that Novec 7500 and polyimide are exemplary fluids and materials used for the microfluidic device 100 and 200, and that other fluids and materials can be used to create the above described dielectric constant difference.

Example 1

Figure 5A:
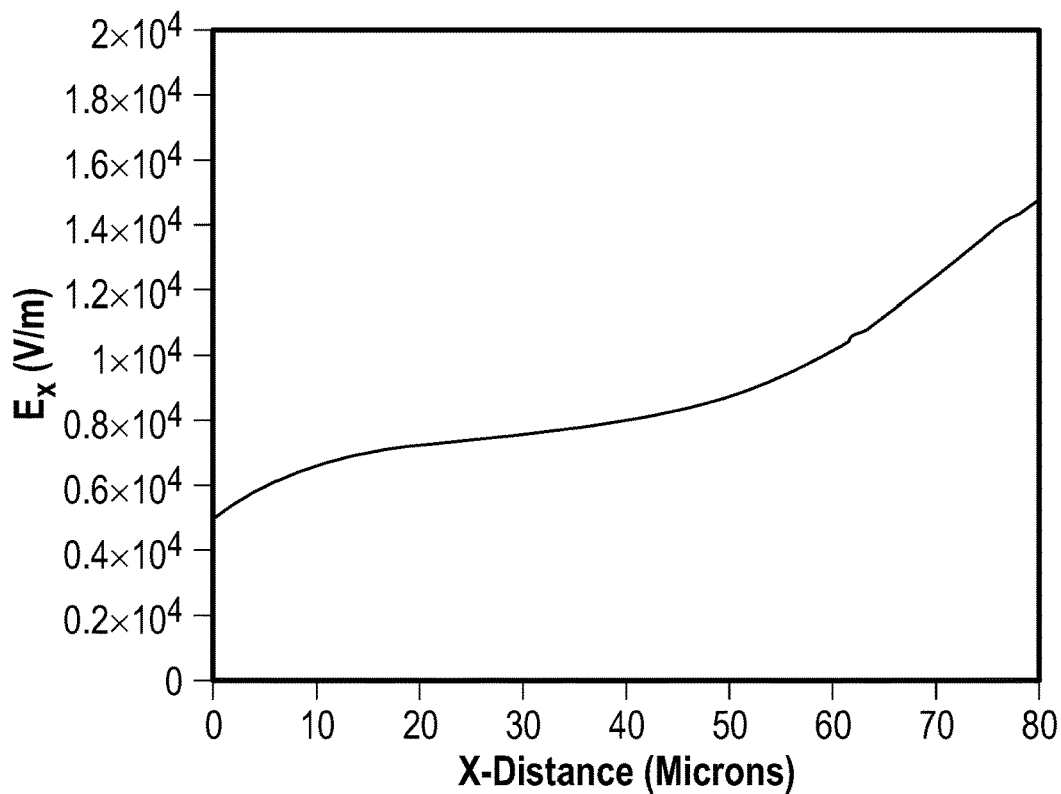
FIGS. 5A and 5B are graphical plots showing the computation of the electric field and electric field gradient of the microfluidic device of FIG. 1.
Figure 5B:
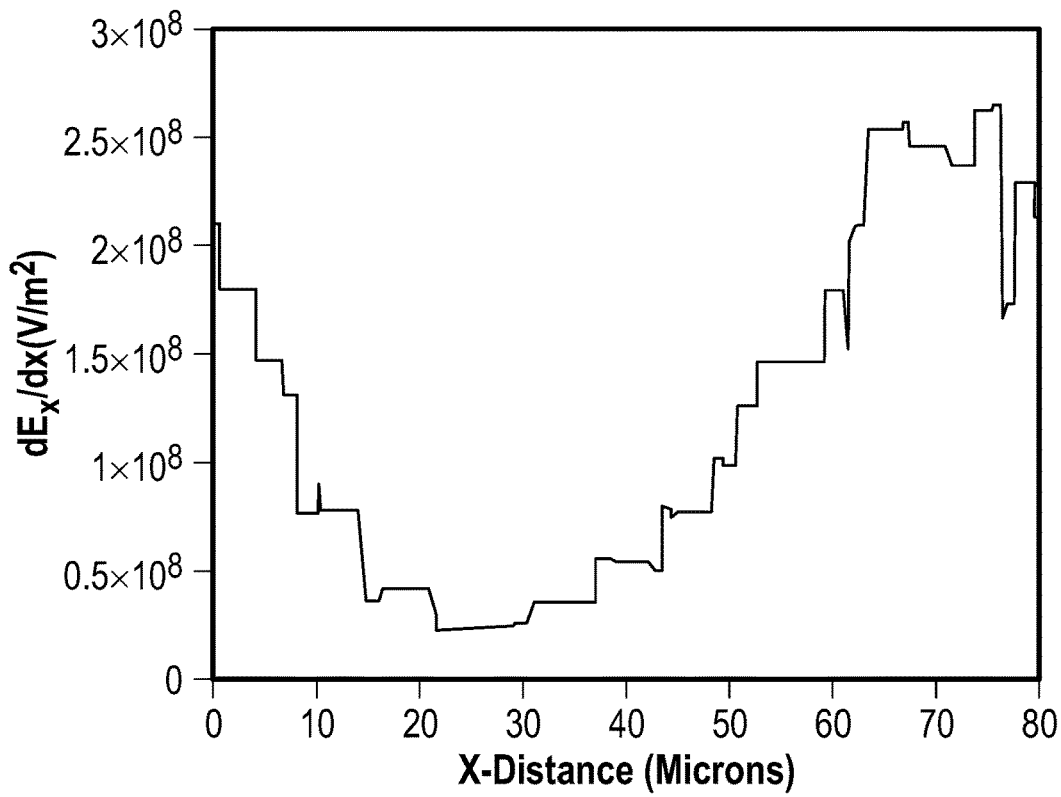

Referring now to FIGS. 5A and 5B, plots generated from the computation of the electric field and electric field gradient are shown. Note that the magnitudes of the computed fields and gradients are consistent with the approximate expected values. Additionally, it is apparent that the geometries discussed above with respect to microfluidic device 100 and 200 is effective in generating the desired electric field gradient.

In one experimental simulation of the microfluidic device 100 and 200 illustrated in FIGS. 1 to 4, a 1.0 volt signal at 10 kHz is applied between the first and second electrodes 140, 240, 150 and 250, and the generated electric field and field line gradient 170 and 270 are computed along a line (e.g., connecting region length 139 and 239) through the center of the connecting region 130 and 230 between the first and second microfluidic channels 110, 210, 120, and 220. As such, using the nominal 1.0 volt applied, and an effective electrode separation of approximately 100 um, the average computed E-field along the computational line is approximately $1.0 \times 10^4$ V/m. Additionally, if an ideal electric field gradient was created using the techniques described above, one would expect an average field gradient on the order of ($10^4$ V/m)/(100 um) or approximately $1.0 \times 10^8$ V/m².

As has been discussed previously, a minimum applied voltage is required to generate an adequate dielectrophoretic force to actuate droplet transfer in the disclosed device. The temporal and polarization characteristics of the applied voltage waveform are also worthy of consideration. Due to the quadratic dependence on the applied voltage of the dielectrophoretic force, as seen in Equation 3 discussed above, the force is independent of the sign of the applied voltage, and is generated equally well by DC, RF, and pulsed waveforms. For configurations where there is direct electrical contact between electrodes and conducting fluids, there are operational advantages to using RF waveforms in order to minimize any potential electrolysis and electrode degradation. Microfluidic devices 100 and 200 are configured to use voltage source 160 and 260 with frequencies on the order of 10 kHz. It should also be noted that the fluid comprising the droplets and the aqueous channel need not be conductive if the dielectric constant (polarizability) of the fluid is very large, as all of the previous electrical arguments are still valid. If the polarization rather than the conductivity is the operative dynamic for the electrical effects, then there are theoretical upper limits to the usable frequency for the applied voltage. For example, for DI water (low conductivity), the applied voltage frequency would need to be less than approximately 10 GHz, as the dielectric constant drops significantly for higher frequencies.

While it is apparent that continuous application of an appropriate voltage to the disclosed device will cause the contents of all droplets in the first microfluidic channel 110 and 210 to be transferred to second microfluidic channel 120 and 220, it will be understood that the voltage waveform can be pulsed on and off to effect the transfer of only selected droplets. Accordingly, the microfluidic device 100 and 200 can be further configured to do droplet sorting by coupling this feature with additional components to determine whether or not it is desirable to transfer a particular droplet to the second microfluidic channel 120 and 220 for further downstream analysis. For example, the determination of which droplets to transfer can be done upstream of the transfer region using many well-known techniques such as image capture and analysis, fluorescence detection, light scattering, conductivity measurements, and many other measurement modalities known to those skilled in the art.

Example 2

FIGS. 6A to 6C and 7A to 7C illustrate the operation of an exemplary microfluidic device 600 fabricated according to the microfluidic device 100 of FIG. 1. During operation of the microfluidic device 600 a stable meniscus 690 (i.e., fluid interface) is established between the stream of immiscible oil flowing through the first microfluidic channel 610 and the stream of aqueous fluid flowing through the second microfluidic channel 620. As such, the microfluidic device 600 may be incorporated with a microfluidic system that includes one or more flow control devices (not shown) fluidly coupled to the second end 614 of the first microfluidic channel 610 and the second end 624 of the second microfluidic channel 620. The stability and position of the meniscus 690 can be controlled using the one or more flow control devices to adjust the back pressure on the output ends of the two flowing channels (i.e., second end 614 of the first microfluidic channel 610 and second end 624 of the second microfluidic channel 620). In one non-limiting example, it is advantageous to have the stable meniscus 690 located at the second opening 638 (i.e., the narrow end adjacent to the second microfluidic channel 620) of the connecting region 630. Thus, the one or more flow control devices (e.g., pressure controlled pumps or other such flow control devices) can be used to maintain a position of the meniscus 690 at the second opening 638 of the connecting region. However, it will be understood that the one or more flow control devices may be used to position the meniscus 690 at other positions, as desired.

The microfluidic device 600 was fabricated by patterning the first and second microfluidic channel 610 and 620, the connecting region 630 and other such features into 50 micron thick sheets of polyimide. The polyimide sheets were subsequently stacked and laminated together to form the three-dimensional microfluidic device 600. The dimensions were approximately those shown and discussed with respect to FIGS. 1 and 2. Furthermore, prior to laminating the stack of polyimide sheets, the first and second electrodes 640 and 650 were fabricated by evaporating or otherwise depositing 150 nm of platinum on the respective top and bottom surfaces of the polyimide sheets forming the first and second microfluidic channels 610 and 620. All of the surfaces of the first and second microfluidic channel 610 and 620 and the connecting region 630 were made hydrophobic via a sol gel process performed after the lamination process.

External capillary connections (not shown) were configured to supply 0.2 μL/min of Novec 7500 with 2% picosurf to the first microfluidic channel 610 (i.e., droplet emulsion channel). A T-junction side channel (not shown) supplied 0.04 μL/min of DI water to generate aqueous droplets 680 in the first microfluidic channel 610 at a rate of about 10 droplets/sec. The connections (not shown) were also configured to supply 0.2 μL/min of DI water to the second microfluidic channel 620 (i.e., the aqueous channel). The meniscus 690 between the first microfluidic channel 610 and the second microfluidic channel 620 was stabilized and positioned at the right (narrow) edge of the connecting region 630 by adjusting the back-pressures of the two output channels with the one or more flow control devices (e.g., pressure controlled pumps or other such flow control devices).

Figure 6A:
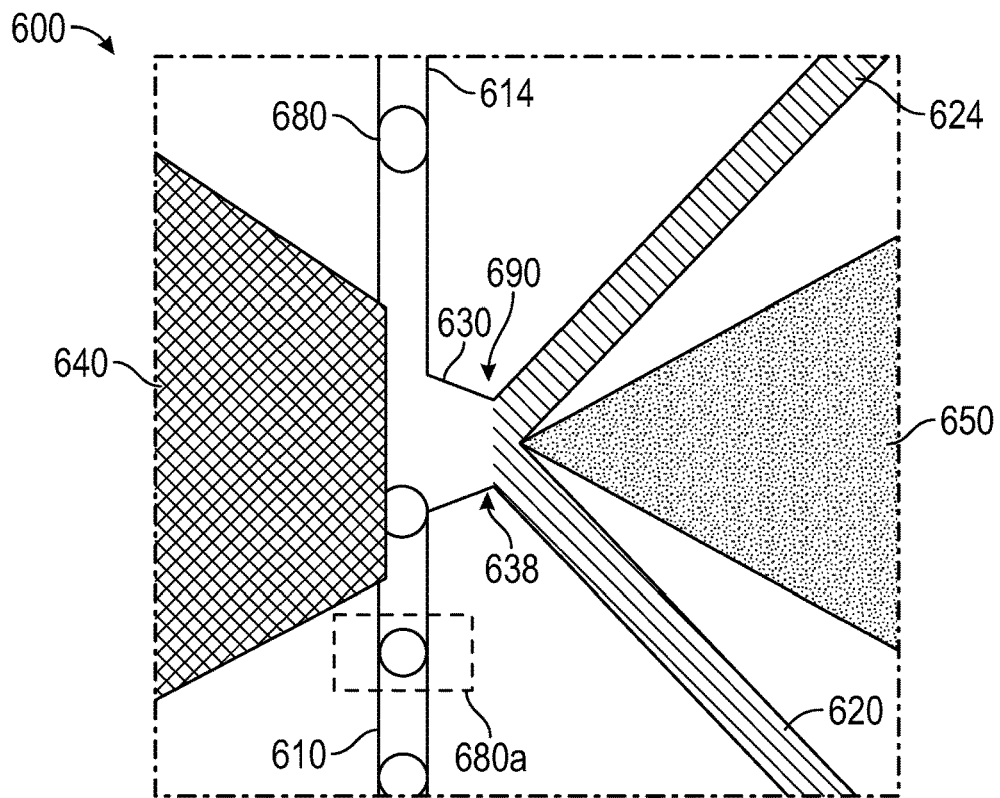
FIGS. 6A, 6B, and 6C, are micrographs of a microfluidic device fabricated according to the schematic of FIG. 1, and showing the progression of droplets through the microfluidic device with no voltage applied.
Figure 6B:
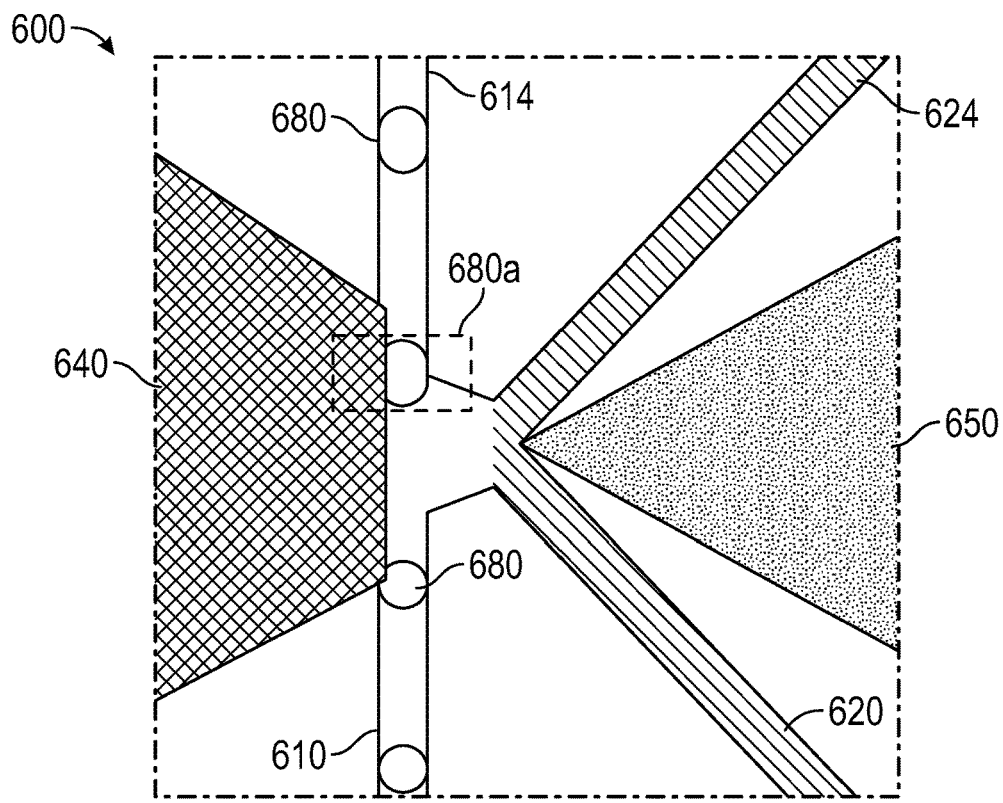
Figure 6C:
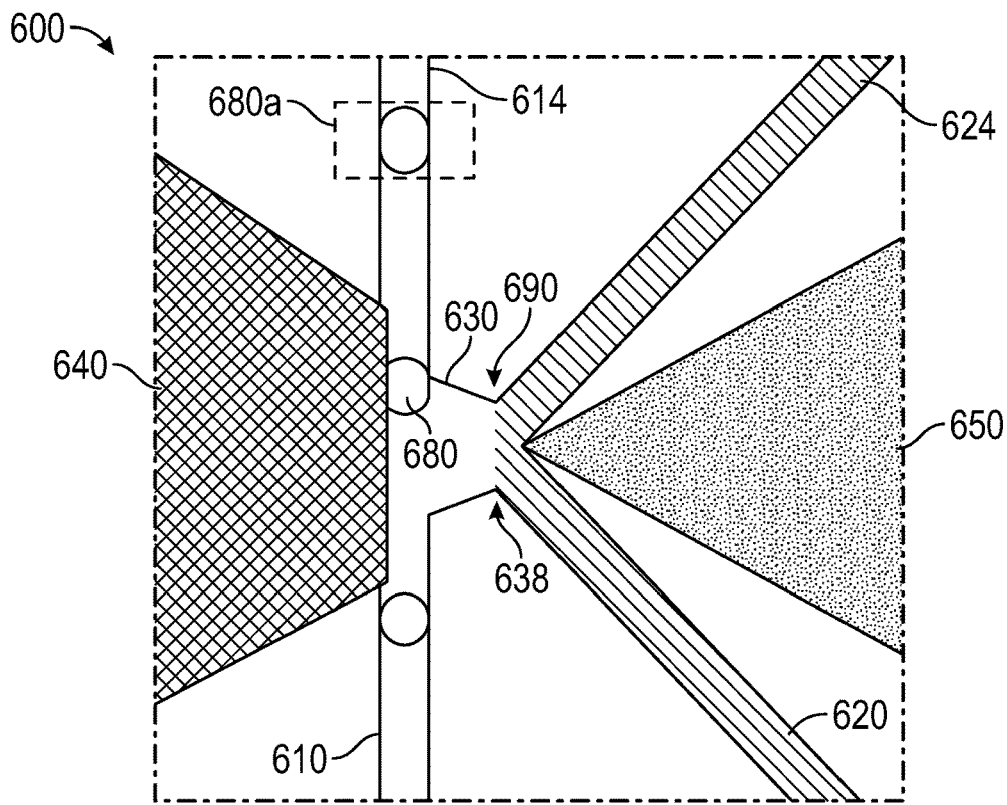

As illustrated in FIGS. 6A to 6C, when no voltage was applied to the microfluidic device 600, the aqueous droplets 680 in the first microfluidic channel 610 continue along the first microfluidic channel 610 to the output for this channel (i.e., second end 614). More specifically, aqueous droplet 680a (identified by dashed box) illustrates the progression of one droplet through the microfluidic device 600 with no voltage applied to the microfluidic device 600. FIG. 6A shows the droplet 680a traveling through the first microfluidic channel 610 upstream from the connecting region 630. FIG. 6B shows droplet 680a traveling past the connecting region 630. The droplet 680a remains in the first microfluidic channel 610 and does not enter the connecting region 630. Finally, FIG. 6C shows the droplet 680a downstream from the connecting region 630 and traveling towards the first microfluidic channel output (i.e., second end 614). As such, the droplet 680a remained in the first microfluidic channel 810 when no voltage was applied to the microfluidic device 600.

Figure 7A:
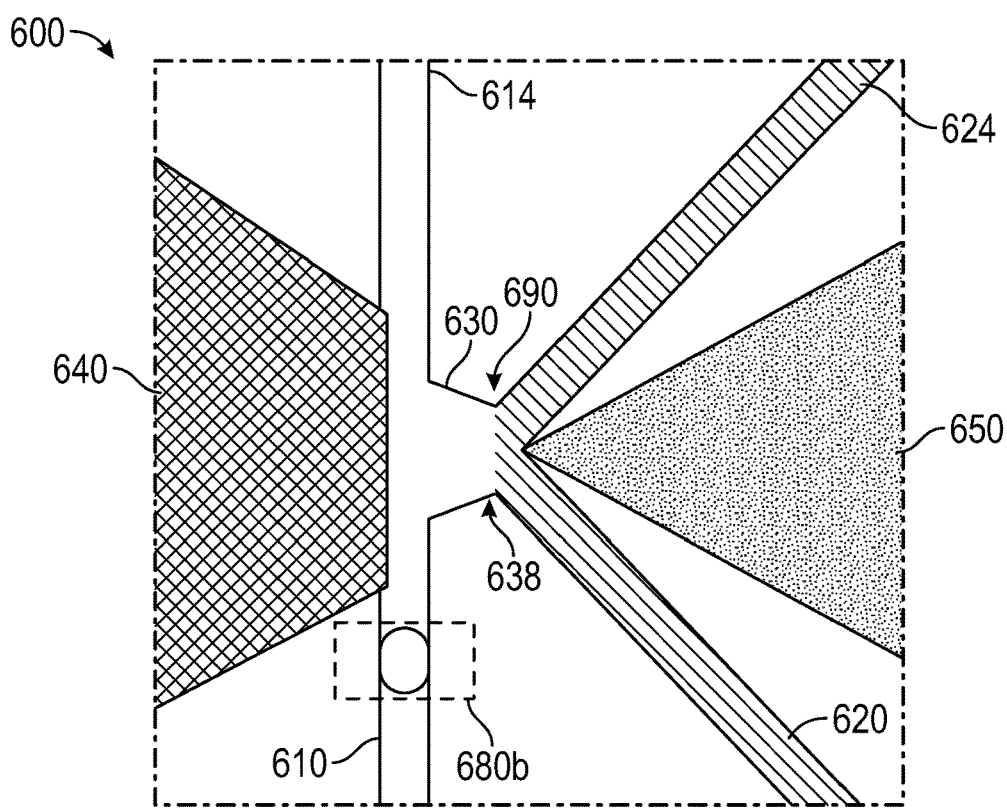
FIGS. 7A, 7B, and 7C, are micrographs of a microfluidic device fabricated according to the schematic of FIG. 1, and showing the progression of droplets through the microfluidic device with voltage applied.
Figure 7B:
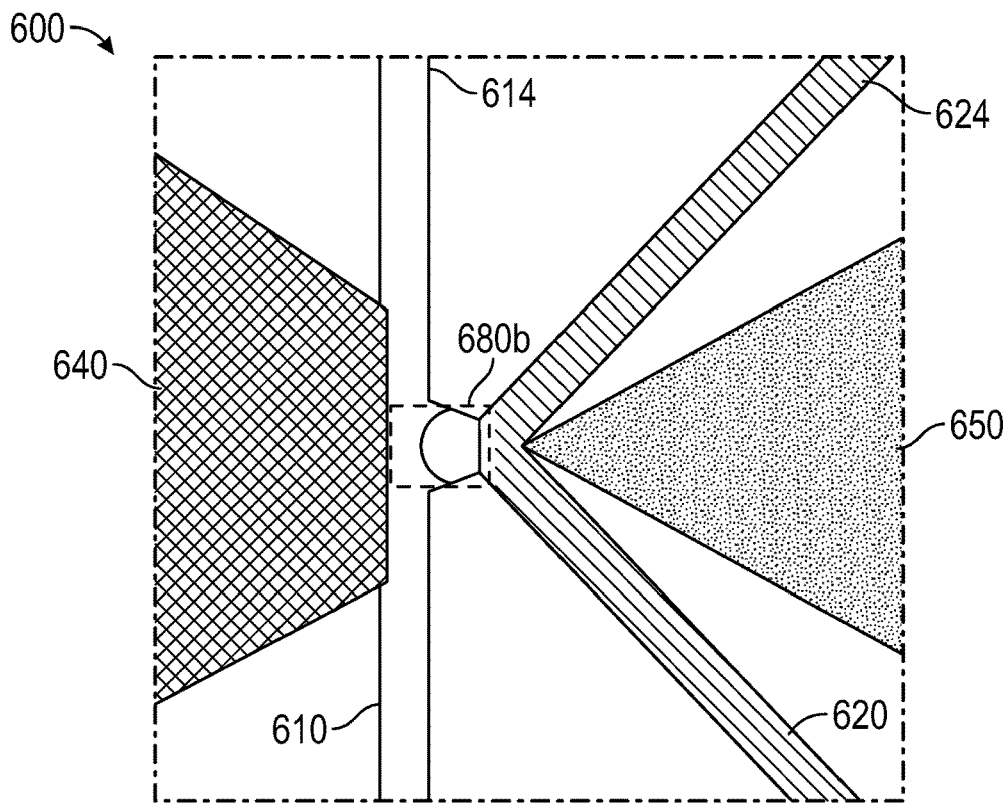
Figure 7C:
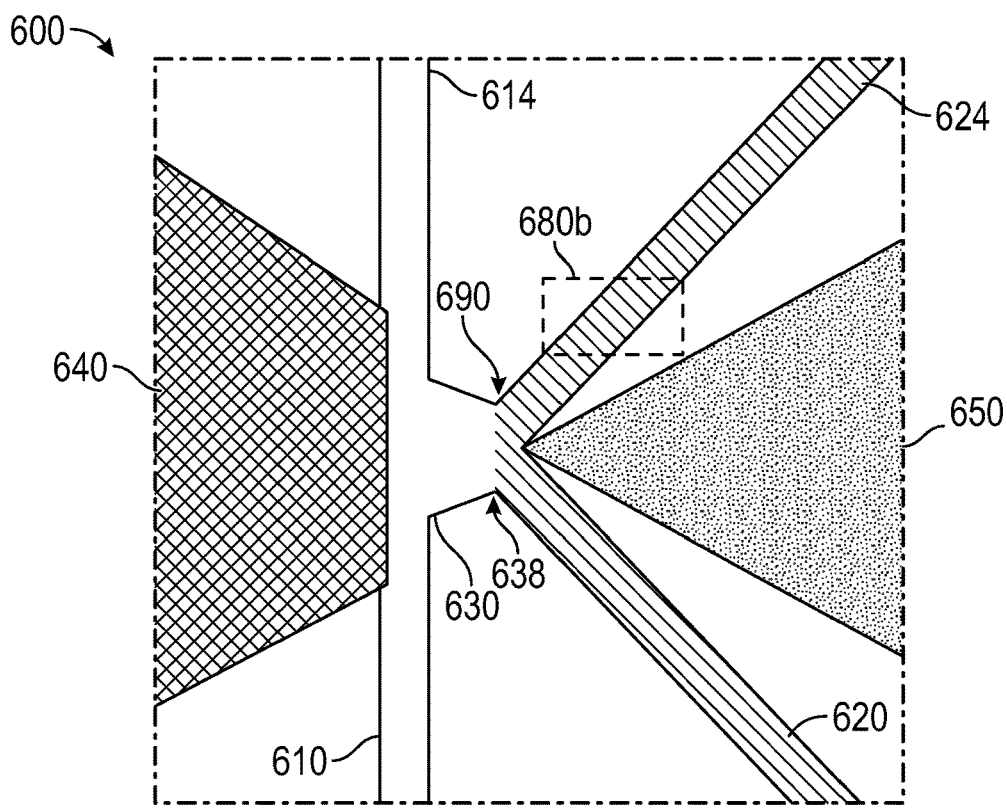

Conversely, as illustrated in FIGS. 7A to 7C, when a voltage was applied to the microfluidic device 600, the aqueous droplets 680 in the first microfluidic channel 610 are transferred to the second microfluidic channel 620 via the connecting region 630. More specifically, aqueous droplet 680b (identified by dashed box) illustrates the progression of one droplet through the microfluidic device with voltage applied to the microfluidic device 600. FIG. 7A shows the droplet 680b traveling through the first microfluidic channel 610 upstream from the connecting region 630. FIG. 7B shows the droplet 680b being diverted into the connecting region 630 such that the droplet 680b is transferred from the first microfluidic channel 610 to the second microfluidic channel 620. Finally, FIG. 7C shows the droplet 680b transferred into the second microfluidic channel 620 and integrated with the aqueous fluid flowing through the second microfluidic channel 620. In one non-limiting example, the voltage applied to the first and second electrodes 640 and 650 was on the order of 100V at 10 kHz and supplied from an RF voltage source. However, it will be understood that different voltages (e.g., higher or lower) from alternative voltage sources (DC, pulsed waveform, etc.) can be used to generate the forces for droplet transfer.

EXEMPLARY EMBODIMENTS

Embodiment 1. A method of separating a droplet of an emulsion in a microfluidic environment, the method including: flowing an emulsion comprising aqueous droplets in a non-aqueous oil medium through a first microfluidic channel, flowing an aqueous medium through a second microfluidic channel alongside the first microfluidic channel, and subjecting the emulsion to a non-uniform electric field gradient such that the aqueous droplets separate from the emulsion and enter the aqueous medium via a connecting region disposed between the first microfluidic channel and the second microfluidic channel.

Embodiment 2. The method of embodiment 1, wherein the connecting region is fluidly coupled to a first opening defined in the first microfluidic channel and a second opening defined in the second microfluidic channel.

Embodiment 3. The method of embodiment 2, wherein a width of the first opening is larger than a width of the second opening.

Embodiment 4. The method of embodiment 2, wherein said flowing provides an interface positioned at the connecting region between the emulsion and the aqueous medium.

Embodiment 5. The method of embodiment 4, wherein said flowing includes adjusting an output of the emulsion flowing through the first microfluidic channel and adjusting an output of the aqueous medium flowing through the second microfluidic channel to maintain a position of the interface at the second opening of the connecting region.

Embodiment 6. The method of embodiment 1, wherein the second microfluidic channel includes a channel corner across the second microfluidic channel from the second opening defined in the second microfluidic channel.

Embodiment 7. The method of embodiment 6, wherein the channel corner defines an angle of no more than 135 degrees, alternatively no more than 120 degrees, alternatively no more than 90 degrees; alternatively no more than 80 degrees; alternatively no more than 70 degrees.

Embodiment 8. The method of embodiment 1, wherein subjecting the emulsion to a dielectrophoretic force by generating the non-uniform electric field gradient.

Embodiment 9. The method of embodiment 8, wherein generating the non-uniform electric field gradient includes positioning a first electrode at the first microfluidic channel and positioning a second electrode at the second microfluidic channel.

Embodiment 10. The method of embodiment 8, wherein generating the non-uniform electric field gradient includes applying a voltage of no more than 150 V to the first and second electrodes, alternatively no more than 120 V, alternatively no more than 100 V, alternatively no more than 80 V, alternatively no more than 40 V.

Embodiment 11. A microfluidic apparatus for separating a droplet of an emulsion in a microfluidic environment including: a flow cell, the flow cell having a first microfluidic channel including a first microfluidic entry channel and first microfluidic exit channel for flowing a first fluid through the flow cell, a second microfluidic channel including a second microfluidic entry channel and second microfluidic exit channel for flowing a stream of a second fluid through the flow cell wherein, in operation, an interface is formed in the flow cell between the first and second fluids. The apparatus further includes a first electrode positioned at the first microfluidic channel, and a second electrode positioned at the second microfluidic channel on an opposite side of the interface with respect to the first electrode, wherein the first electrode and the second electrode are configured to generate a non-uniform electric field gradient.

Embodiment 12. The microfluidic apparatus of embodiment 11, wherein the first electrode is substantially flat and long, and wherein the second electrode is substantially sharp.

Embodiment 13. The microfluidic apparatus of embodiment 11, further comprising a connecting region disposed between the first microfluidic channel and the second microfluidic channel, the connecting region including a first opening defined in the first microfluidic channel and a second opening defined in the second microfluidic channel, Embodiment 14. The microfluidic apparatus of embodiment 13, wherein a width of the first opening is larger than a width of the second opening.

Embodiment 15. The microfluidic apparatus of embodiment 13, wherein the interface formed in the flow cell is positioned at the second opening of the connecting region, and wherein the first and second electrodes are sized and positioned to produce a maximum electric field gradient at the interface.

Embodiment 16. The microfluidic apparatus of embodiment 11, wherein the second microfluidic channel includes a channel corner across the second microfluidic channel from the second opening defined in the second microfluidic channel.

Embodiment 17. The microfluidic apparatus of embodiment 16, wherein the channel corner defines an angle of no more than 135, alternatively no more than 120 degrees, alternatively no more than 90 degrees, alternatively no more than 80 degrees; alternatively no more than 70 degrees.

Embodiment 18. The microfluidic apparatus of embodiment 11, wherein the first and second electrodes are configured to produce a dielectrophoretic force.

Embodiment 19. The microfluidic apparatus of embodiment 18, wherein generating the dielectrophoretic force includes applying a voltage of no more than 150 V to the first and second electrodes, alternatively no more than 120 V, alternatively no more than 100 V, alternatively no more than 80 V, alternatively no more than 40 V.

Embodiment 20. A microfluidic separation system including: the microfluidic apparatus of embodiment 13, and one or more flow controlling devices coupled to the first microfluidic exit channel and the second microfluidic exit channel, wherein the one or more flow controlling devices are configured to adjust an output of the first microfluidic exit channel and the second microfluidic exit channel to maintain a position of the interface at the second opening of the connecting region.

In view of this disclosure it is noted that the methods and apparatus can be implemented in keeping with the present teachings. Further, the various components, materials, structures and parameters are included by way of illustration and example only and not in any limiting sense. In view of this disclosure, the present teachings can be implemented in other applications and components, materials, structures and equipment to implement these applications can be determined, while remaining within the scope of the appended claims.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

Unless otherwise indicated, the terms "first", "second", "third", and other ordinal numbers are used herein to distinguish different elements of the present apparatus and methods, and are not intended to supply a numerical limit. For instance, reference to first and second openings should not be interpreted to mean that the apparatus only has two openings. An apparatus having first and second elements can also include a third, a fourth, a fifth, and so on, unless otherwise indicated.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

We claim:

1. A method of separating a droplet of an emulsion in a microfluidic environment, the method comprising:
    flowing an emulsion comprising aqueous droplets in a non-aqueous medium through a first microfluidic channel;
    flowing an aqueous medium through a second microfluidic channel alongside the first microfluidic channel; and
    subjecting the emulsion to a non-uniform electric field gradient such that the aqueous droplets separate from the emulsion and enter the aqueous medium via a connecting region disposed between the first microfluidic channel and the second microfluidic channel, wherein the non-uniform electric field gradient is generated by positioning a flat rectangular electrode at the first microfluidic channel and positioning a sharp electrode at a channel corner of the second microfluidic channel, and wherein the channel corner acts as a proxy electrode, such that the shape of the proxy electrode is configured to determine the shape of the electric field gradient generated between the flat rectangular electrode and the second microfluidic channel.

2. The method of claim 1, wherein the connecting region is fluidly coupled to a first opening defined in the first microfluidic channel and a second opening defined in the second microfluidic channel.

3. The method of claim 2, wherein a width of the first opening is larger than a width of the second opening.

4. The method of claim 2, wherein said flowing provides an interface positioned at the connecting region between the emulsion and the aqueous medium.

5. The method of claim 4, wherein said flowing includes adjusting an output of the emulsion flowing through the first microfluidic channel and adjusting an output of the aqueous medium flowing through the second microfluidic channel to maintain a position of the interface at the second opening of the connecting region.

6. The method of claim 2, wherein the second microfluidic channel positions the channel corner across the second microfluidic channel from the second opening defined in the second microfluidic channel.

7. The method of claim 6, wherein the channel corner defines an angle of no more than 135 degrees.

8. The method of claim 1, wherein subjecting the emulsion to a dielectrophoretic force by generating the non-uniform electric field gradient.

9. The method of claim 1, wherein generating the non-uniform electric field gradient includes applying a voltage of no more than 150 V.

10. A microfluidic apparatus for separating a droplet of an emulsion in a microfluidic environment, the apparatus comprising:
    a flow cell, the flow cell having: a first microfluidic channel including a first microfluidic entry channel and first microfluidic exit channel for flowing a first fluid through the flow cell;
    a second microfluidic channel including a second microfluidic entry channel and a second microfluidic exit channel for flowing a stream of a second fluid through the flow cell, wherein, in operation, an interface is formed in the flow cell between the first and second fluids;
    a first electrode comprising a flat rectangular electrode positioned at the first microfluidic channel; and
    a second electrode comprising a sharp electrode positioned at a channel corner of the second microfluidic channel on an opposite side of the interface with respect to the first electrode,
    wherein the first electrode and the second electrode are configured to generate a non-uniform electric field gradient, and wherein the channel corner acts as a proxy electrode, such that the shape of the proxy electrode is configured to determine the shape of the electric field gradient generated between the flat rectangular electrode and the second microfluidic channel.

11. The microfluidic apparatus of claim 10, further comprising a connecting region disposed between the first microfluidic channel and the second microfluidic channel, the connecting region including a first opening defined in the first microfluidic channel and a second opening defined in the second microfluidic channel.

12. The microfluidic apparatus of claim 11, wherein a width of the first opening is larger than a width of the second opening.

13. The microfluidic apparatus of claim 11, wherein the interface formed in the flow cell is positioned at the second opening of the connecting region, and wherein the first and second electrodes are sized and positioned to produce the non-uniform electric field gradient at the interface.

14. The microfluidic apparatus of claim 11, wherein the second microfluidic channel positions the channel corner across the second microfluidic channel and opposite from the second opening defined in the second microfluidic channel.

15. The microfluidic apparatus of claim 14, wherein the channel corner defines an angle of no more than 135 degrees.

16. The microfluidic apparatus of claim 10, wherein the first and second electrodes are configured to produce a dielectrophoretic force.

17. The microfluidic apparatus of claim 16, wherein generating the dielectrophoretic force includes applying a voltage of no more than 150 V to the first and second electrodes.

18. A microfluidic separation system comprising:
the microfluidic apparatus of claim 11; and
one or more flow controlling devices coupled to the first microfluidic exit channel and the second microfluidic exit channel, wherein the one or more flow controlling devices are configured to adjust an output of the first microfluidic exit channel and the second microfluidic exit channel to maintain a position of the interface at the second opening of the connecting region.

* * * * *